March 21, 1939.  A. P. JOHNSTON  2,150,925
WELDING ELECTRODE COATING
Filed Oct. 19, 1936
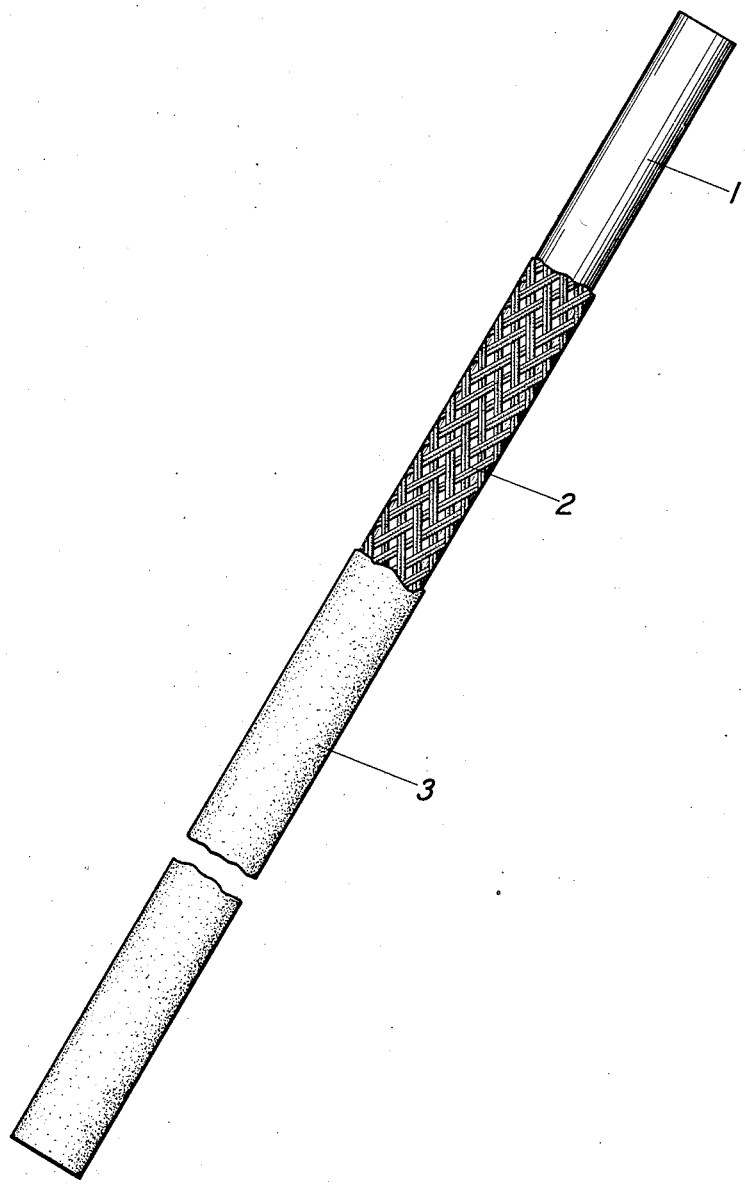
Inventor
ARCHIBALD P. JOHNSTON
by
Attorney Patented Mar. 21, 1939

2,150,925

UNITED STATES PATENT OFFICE 2,150,925

WELDING ELECTRODE COATING

Archibald P. Johnston, Altadena, Calif., assignor to Standard Oil Company of California, San Francisco, Calif., a corporation of Delaware Application October 19, 1936, Serial No. 106,423

3 Claims. (Cl. 148—26)

This invention relates to a composition of material for a coated welding electrode and particularly to a coating for a mild steel or alloy rod to be used in arc welding.

In metallic arc welding the weld is produced through the agency of an electric arc established between the work and a metal rod or pencil commonly referred to as an electrode. By associating certain materials with the electrode as a core or coating, the operating characteristics of the arc and the quality of the deposited weld metal are greatly improved. Such materials are referred to as fluxes.

These fluxes may be of such a nature or the rod to which they are applied may be so prepared, as by grooving or otherwise deforming its surface, that the flux material will adhere securely thereto. It is sometimes preferable, however, to provide a fabric or other reinforcing material around a smooth rod and impregnate or fill the interstices in the fabric. This fabric may be applied in the form of a tape, a helical thread winding or an open mesh braid woven about the wire or rod which forms the metal body of the electrode.

It is an object of my invention to provide a fluxed electrode for producing sound ductile welds of high tensile strength.

It is a further object of my invention to provide an electrode which will operate equally well in a down hand and also an over head position, depositing a very fluid material which is adequately protected during its deposition and cooling by a slag which is subsequently easily removed.

These and other objects will be further apparent from the following description and from the accompanying drawing, which forms a part of this specification and illustrates a preferred embodiment of this invention.

The electrode illustrated in the drawing comprises a metallic rod 1 provided with a cellulosic fabric covering, in this case an open mesh braid of cotton, which may or may not be given a preliminary treatment with a purifying agent such as sodium hydroxide, or rayon or other material suitable to form a reinforcing and holding structure that will enter into the flame of the arc and form products desirable in the shielding of the arc and the weld metal deposited thereby.

The fabric covering 2 is filled with a flux material 3 of substantially the following composition:

| | Percent |
|---|---|
| Aluminum oxide | 10 to 40 |
| Manganese carbonate | 0 to 10 |
| Titanium dioxide | 20 to 54 |
| Sodium silicate (40° Bé.) | 15 to 35 |

The manganese carbonate may be wholly or partly replaced by ferro-manganese, and is to be so interpreted in the appended claims. The titanium dioxide component may be furnished by one or more of the natural minerals, such as rutile or ilmenite. Powdered silica up to as much as 50% may be employed, particularly for rod to be used in the down hand position. The solid materials are preferably in powdered form and are mixed with the sodium silicate to form a paste or slurry which may be diluted with water if necessary to produce the proper consistency for adhesion to the rod and the cellulosic braid. The sodium silicate acts as a binder for the coating components as well as adding silica to the slag formed by the heat of the arc and the amount employed may be varied through rather wide limits without noticeably affecting the operation of the welding arc or the characteristics of the deposited metal.

This coating may be applied to the electrode in the following order. The cellulosic reinforcing 2 is first wound or braided over the bare rod 1, after which the rod is passed through a bath of flux material 3, as specified above, this paste being preferably mechanically manipulated or rubbed into the interstices of the braid to completely fill the same. In passing from this bath the coated rod is preferably drawn through a die or equivalent means whereby excess paste is removed and the thickness of the flux is limited to approximately the thickness of the braid.

Alternatively, the flux materials may be first applied to the metal rod, after which the fabric may be woven, or wound or braided thereover, either while the paste is still wet or after it has set, and additional flux paste applied to form a smooth and dense covering.

Although this coating will dry within a reasonable time at atmospheric temperatures, it may be found desirable to facilitate the drying by heating the completed rod at a temperature of 200–250° F., for a period of 1–5 minutes.

The filling material above may be used alone as a flux, but best results are obtained when using it with a cellulosic material such as the braided or woven fabric covering as described above, the weave or mesh of the fabric being so related to the threads forming the same and to the thickness of the flux material that the cellulosic material forms from 20 to 35% of the finished coating.

Although a specific composition and mode of making the coated welding electrode of this invention are described and illustrated above, it is obvious that numerous changes and variations may be made therein without departing from the scope of the following claims:

I claim:

1. A flux for use in arc welding, consisting of:

| | Percent |
|---|---|
| Aluminum oxide | 36 |
| Manganese carbonate | 10 |
| Titanium dioxide | 54 | with a sodium silicate binder.

2. A flux for use in arc welding, consisting of:

| | Percent |
|---|---|
| Aluminum oxide | 10 to 30 |
| Manganese carbonate | 0 to 10 |
| Titanium dioxide | 20 to 50 |
| Sodium silicate | 15 to 35 |
| Silica | 0 to 50 |

3. A flux for use in arc welding consisting of the following materials in approximately the proportions given:

| | Percent |
|---|---|
| Aluminum oxide | 15 |
| Manganese carbonate | 10 |
| Titanium dioxide | 50 |
| Silica | 15 | with sodium silicate in excess of 10% to form a paste.

ARCHIBALD P. JOHNSTON.